Figure 1:
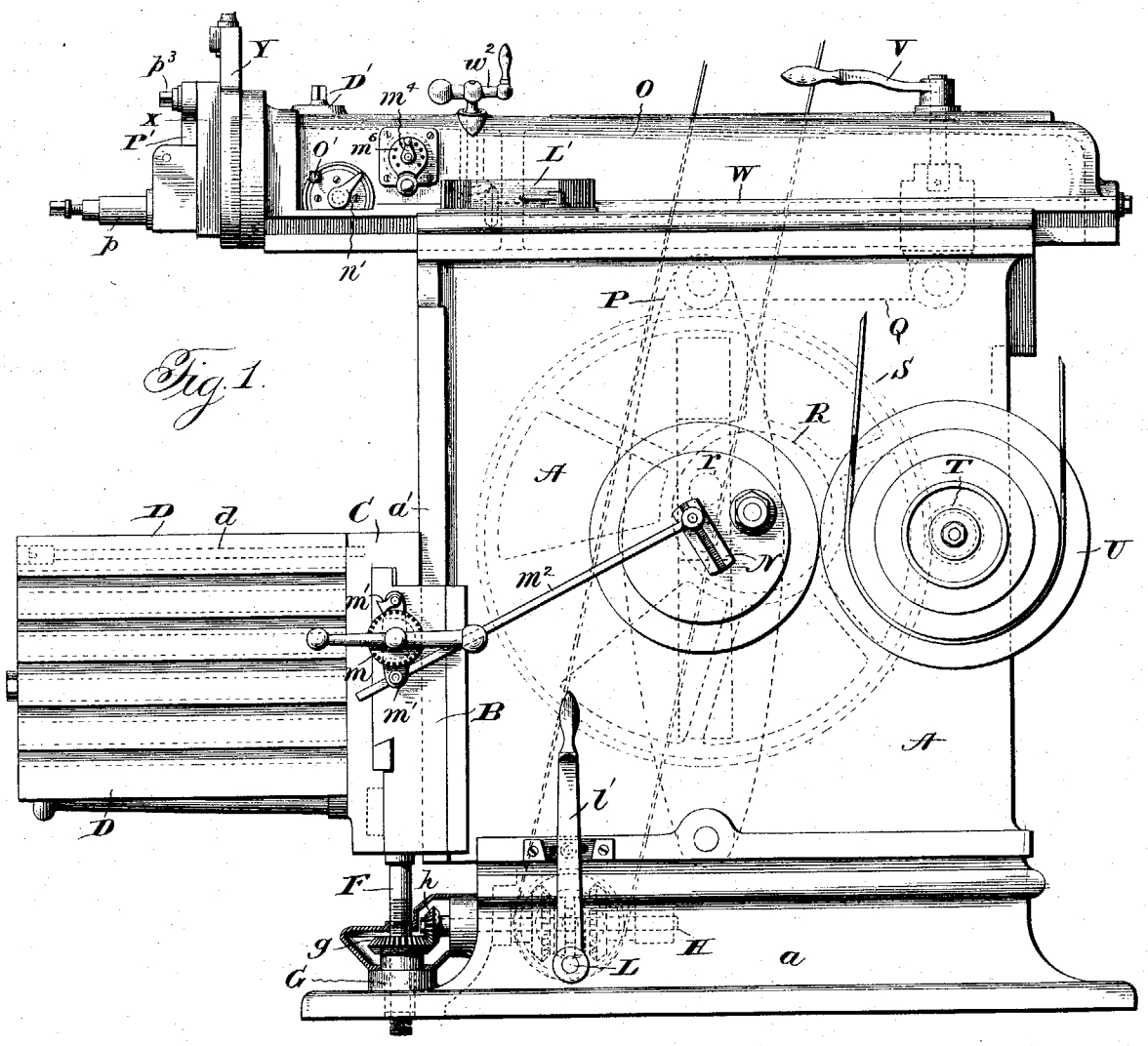

No. 12,287. REISSUED NOV. 22, 1904.

J. C. POTTER & J. JOHNSTON.

SHAPING MACHINE.

APPLICATION FILED JULY 18, 1901.

6 SHEETS—SHEET 1.

Witnesses:
Jas. E. Hutchinson
Henry C. Hazard

Inventors
Jas. C. Potter and John Johnston, by
Prindle and Russell, their Att'ys

PHOTO-LITHOGRAPHED BY SACKETT & WILHELMS LITHO. & PTG. CO. NEW YORK.

No. 12,287. REISSUED NOV. 22, 1904.

J. C. POTTER & J. JOHNSTON.

SHAPING MACHINE.

APPLICATION FILED JULY 18, 1901.

6 SHEETS—SHEET 2.

Witnesses:
Jas. E. Hutchinson.
Henry C. Hazard

Inventors.
Jas. C. Potter and John Johnston, by
Prindle and Russell, their Att'ys

PHOTO-LITHOGRAPHED AT SACKETT & WILHELMS LITHO. & PTG. CO. NEW YORK.

No. 12,287. REISSUED NOV. 22, 1904.

J. C. POTTER & J. JOHNSTON.

SHAPING MACHINE.

APPLICATION FILED JULY 18, 1901.

6 SHEETS—SHEET 3.

Witnesses:
Jas. E. Hutchinson.
Henry C. Hazard

Inventors.
Jas. C. Potter and John Johnston, by
Prindle and Russell, their attys.

SHEET LITHOGRAPHED BY SACHATT & WILHELME LITHO. & PTG. CO. NEW YORK.

No. 12,287. REISSUED NOV. 22, 1904.

J. C. POTTER & J. JOHNSTON.

SHAPING MACHINE.

APPLICATION FILED JULY 18, 1901.

6 SHEETS—SHEET 4.

Witnesses:
Jas. E. Hutchinson.
Henry C. Hazard

Inventors.
Jas. C. Potter and John Johnston, by
Prindle and Russell, their Atty's

PHOTO-LITHOGRAPHED BY SACKETT & WILHELMS LITHO. & PTG. CO. NEW YORK.

No. 12,287. REISSUED NOV. 22, 1904.

J. C. POTTER & J. JOHNSTON.

SHAPING MACHINE.

APPLICATION FILED JULY 18, 1901.

6 SHEETS—SHEET 5.

Witnesses:
Jas. E. Hutchinson.
Henry C. Hazard

Inventors,
Jas. C. Potter and John Johnston, by
Prindle and Russell, their Attys.

PHOTO-LITHOGRAPHED BY SACHETT & WILHELMS LITHO. & PTG. CO. NEW YORK.

No. 12,287. REISSUED NOV. 22, 1904.

J. C. POTTER & J. JOHNSTON.

SHAPING MACHINE.

APPLICATION FILED JULY 18, 1901.

6 SHEETS—SHEET 6.

Witnesses:
Jas. E. Hutchinson.
Henry C. Hazard

Inventors.
Jas. C. Potter and John Johnston, by
Prindle and Russell, their attys

PHOTO-LITHOGRAPHED BY SACHETT & WILHELMS LITHO. & PTG. CO. NEW YORK.

No. 12,287. Reissued November 22, 1904.

UNITED STATES PATENT OFFICE.

JAMES CHARLES POTTER AND JOHN JOHNSTON, OF PAWTUCKET, RHODE ISLAND, ASSIGNORS, BY MESNE ASSIGNMENTS, TO THE POTTER AND JOHNSTON MACHINE COMPANY, OF PAWTUCKET, RHODE ISLAND, A CORPORATION OF RHODE ISLAND.

SHAPING-MACHINE.

SPECIFICATION forming part of Reissued Letters Patent No. 12,287, dated November 22, 1904.

Original No. 649,175, dated May 8, 1900. Application for reissue filed July 18, 1901. Serial No. 68,748.

*To all whom it may concern:*

Be it known that we, JAMES CHARLES POTTER and JOHN JOHNSTON, of Pawtucket, county of Providence, State of Rhode Island, have invented certain new and useful Improvements in Shaping-Machines, for which Letters Patent No. 649,175 were issued upon the 8th day of May, 1900, which Letters Patent have been found to be inoperative and defective and not to cover fully the invention set forth in the specification and shown in the drawings, which were filed by us in the Patent Office upon the 15th day of December, 1898, preparatory to the obtaining of said Letters Patent. Now, therefore, being desirous of reissuing said Letters Patent, we do hereby declare the following to be a full, clear, and exact description of said improvement, reference being had to the accompanying drawings, in which—

Figure 2:
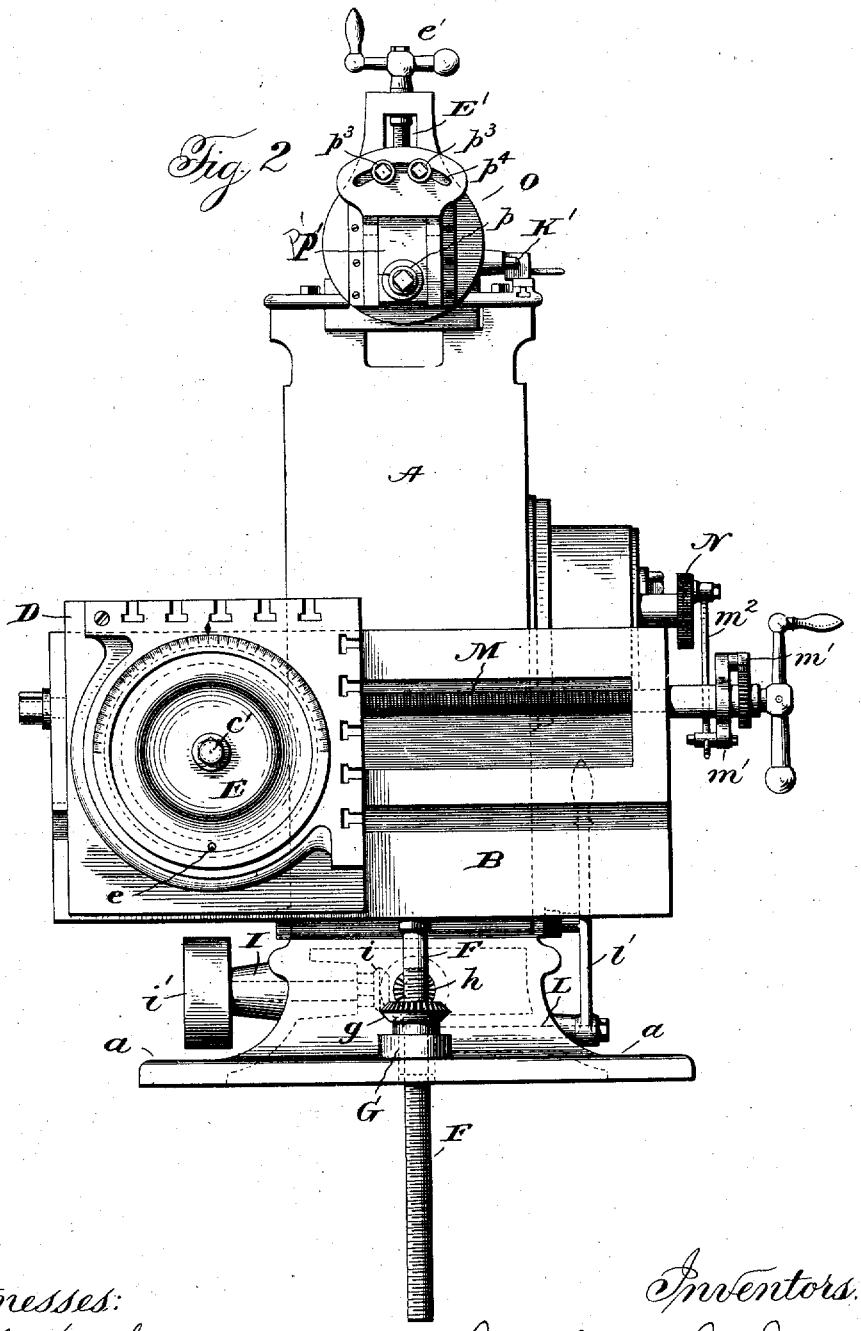
Figure 3:
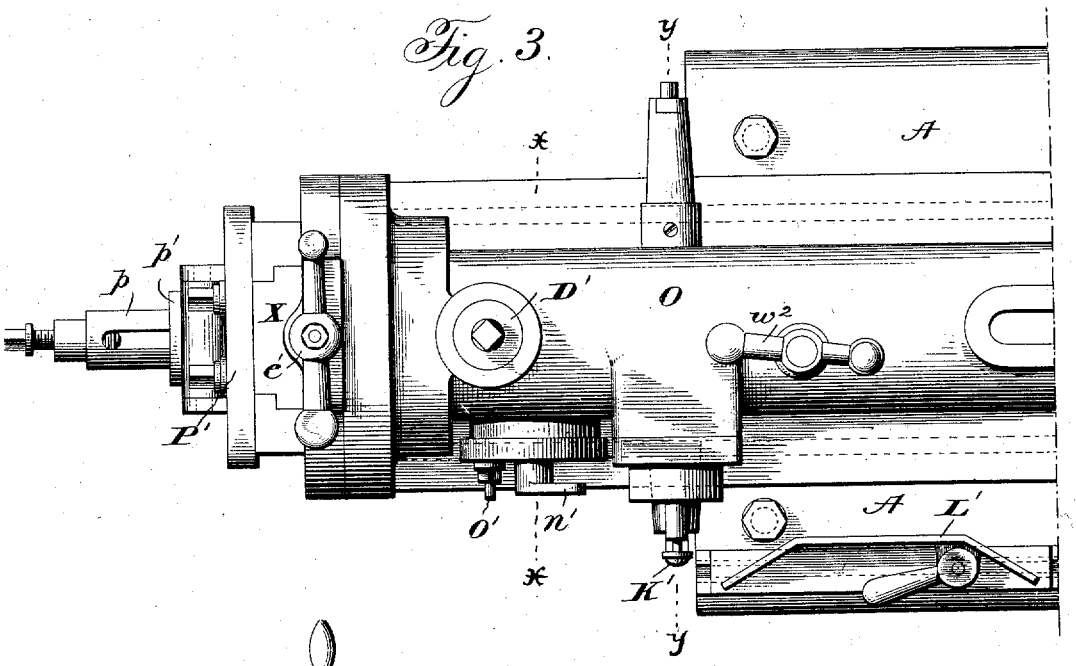
Figure 4:
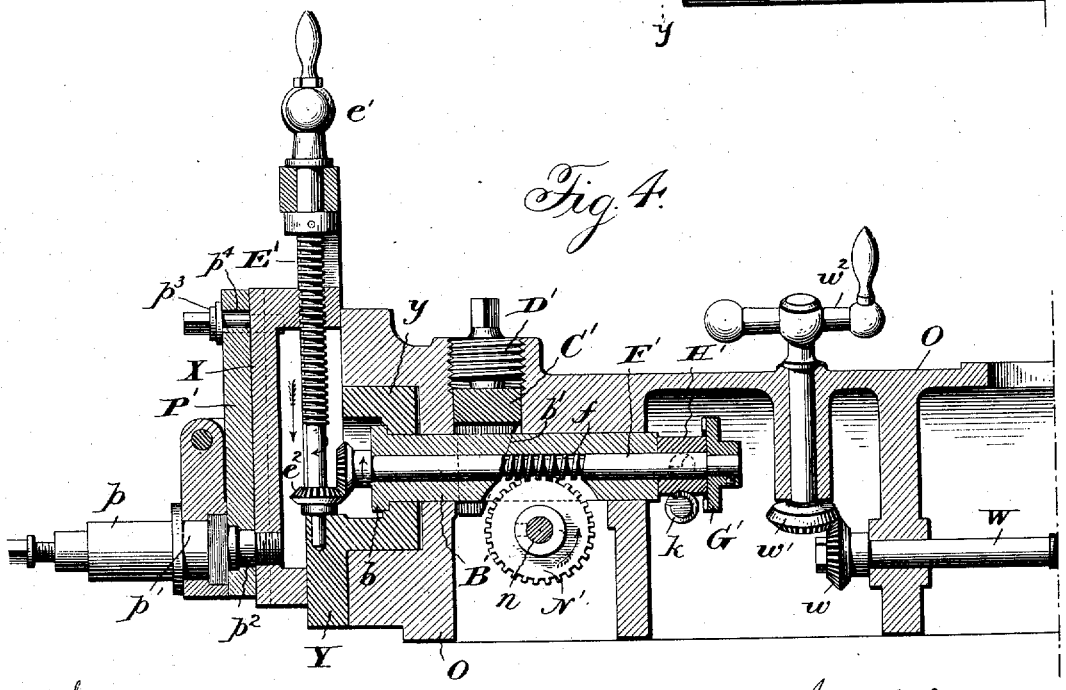
Figure 5:
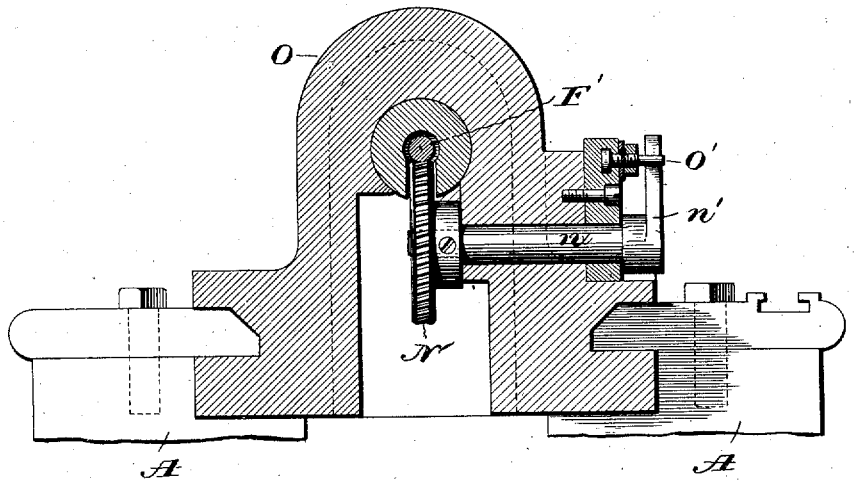
Figure 6:
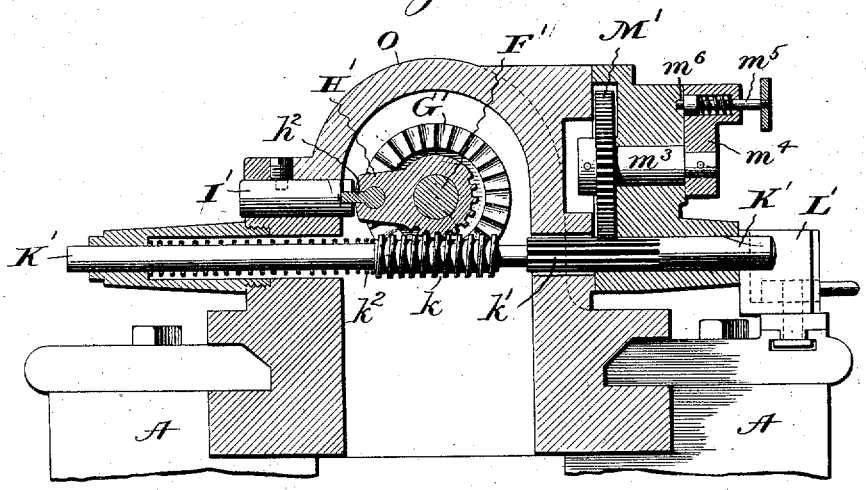
Figure 7:
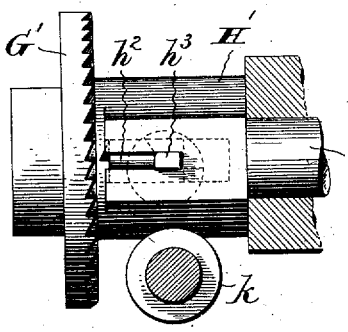
Figure 8:
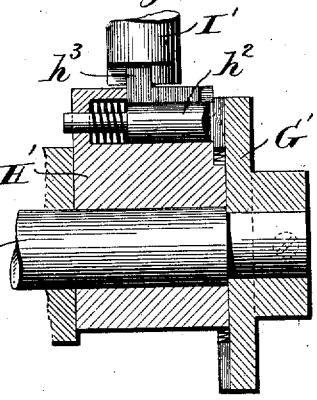
Figure 9:
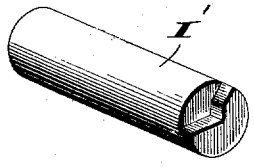
Figure 10:
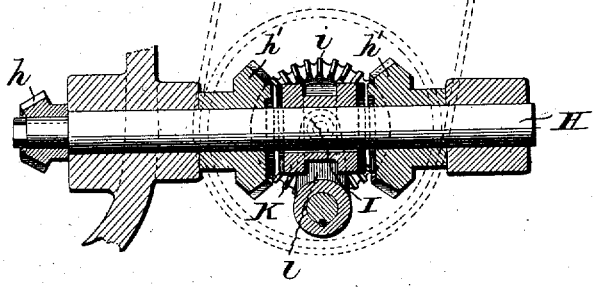
Figure 11:
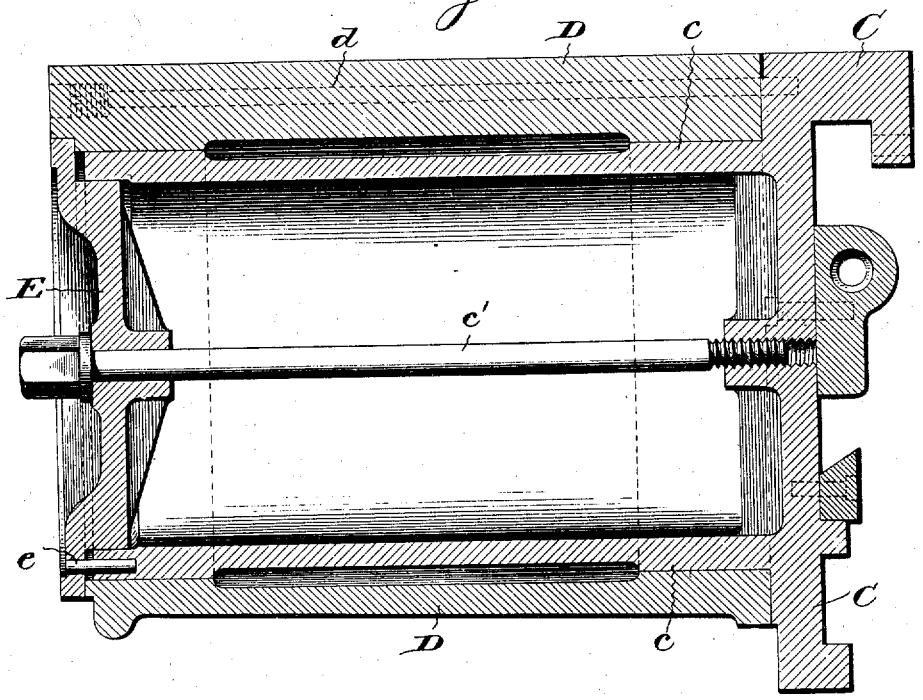
Figure 12:
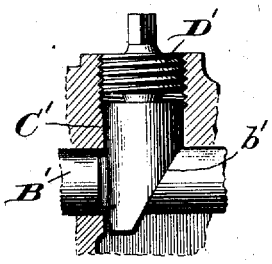
Figure 13:
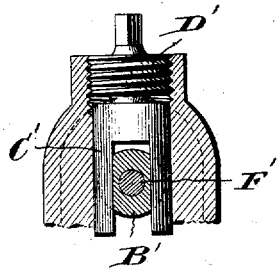

Figure 1 is a view in side elevation of a shaping-machine embodying our invention. Fig. 2 is a view in front elevation. Fig. 3 is a top plan view, on a larger scale, of a portion of the machine. Fig. 4 is a vertical longitudinal section of the portion of the machine illustrated in Fig. 3. Fig. 5 is a cross-section of the tool-carriage on the line *x x* of Fig. 3, showing the mechanism for arresting the feed of the tool. Fig. 6 is a like view on the line *y y* of Fig. 3, showing the mechanism for automatically feeding the tool. Figs. 7 and 8 are detail views of the pawl-and-ratchet device of the automatic tool-feeding mechanism. Fig. 9 is a detail view in perspective of the cam-pin for disengaging the pawl from the ratchet. Fig. 10 is a detail view in section of the work-bed-adjusting gearing. Fig. 11 is a longitudinal section of the rotatable work-holder and its support. Fig. 12 is a detail view, partly in side elevation and partly in section, showing the tool-head-clamping device; and Fig. 13 is a detail view, partly in end elevation and partly in section, of said device.

Letters of like name and kind refer to like parts in each of the figures.

Our invention relates to the class of metal-working machines wherein the cutting-tool is reciprocated and the work is stationary, the object being to render machines of this class more automatic and secure greater uniformity and accuracy in the work; and to such end the invention consists in the construction and arrangement of parts substantially as hereinafter specified.

In the embodiment of our invention illustrated in the drawings a frame A is employed that has the form of a hollow box-like structure with a suitable base *a* and constitutes the standard or support of the machine. On one of its ends said frame A has vertical ways *a'* and *a'*, on which is slidably mounted a carriage B. Slidably mounted on horizontal ways on the carriage B is a second carriage C, from which projects horizontally a cylindrical bearing or trunnion *c*, upon which is rotatably placed a work-holder D. The work-holder has two flat faces or beds at right angles to each other and is provided with longitudinal grooves for the attachment of clamps for securing the work. A plate or head E at the outer end of the trunnion overlapping the outer end of the work-holder and through which passes a screw rod or bolt *c'*, that enters a threaded opening in the carriage C, is provided to clamp or hold the work-holder against rotation or in a fixed position on said carriage C. It will be observed that the trunnion *c*, reaching through substantially the entire length of the work-holder, forms a most rigid and strong support for the work-holder.

To enable the work-holder to be accurately adjusted with the beds at a desired angle, the head, either partly or entirely around adjacent to its periphery, can be graduated, and an index put on the work-holder. The head E is secured to the bearing or trunnion *c*, so as not to turn relative to the latter, by a pin *e*, and the work-holder D may be positively held in the position in which it is most often used by a rod $d$, that extends through the work-holder and into a hole in the carriage C, being threaded for a short distance at its outer end to engage a thread in the work-holder.

The work-holder is preferably raised and lowered by power, and for this purpose a vertical screw F is provided, that extends downward from the carriage B and is engaged by a nut G, supported on the frame-base and having a bevel-pinion $g$, meshing with a like pinion $h$ on a horizontal power-driven shaft H. For revolving the latter in either direction to raise or lower the work-holder there are two oppositely-facing bevel-gears $h'$ and $h'$ loose on the shaft H, both of which mesh with a bevel-gear $i$ on a shaft I, to which a band-pulley $i'$ is secured. A double clutch K, connected to the shaft H by a spline, is employed to connect either of the bevel-gears $h'$ and $h'$ with the shaft, which clutch is engaged by an arm $l$ on the rock-shaft L, having a hand-lever $l'$, by which the shaft may be rocked to shift the clutch either to free it from both bevel-gears or to place it in engagement with one or the other, suitable stops being provided to hold the lever to retain the clutch in its several positions.

For feeding the work-holder laterally a screw M is employed adapted to be revolved by hand or automatically, and for the latter a ratchet-wheel $m$ is fixed to the screw that is actuated by a pawl on a pawl-lever $m'$, that is connected by a rod $m^2$ to a crank N on one of the shafts of the gearing by which the tool-carriage or ram is reciprocated.

The tool-carriage or ram O is mounted in horizontal ways on the top of the frame A, the mechanism for reciprocating it being of usual construction and comprising a lever P, connected by a link Q with the ram and vibrated by a crank-pin $r$ on a disk R, a gear S, carrying the latter eccentrically, a pinion T, meshing with the gear, and a cone-pulley U on the same shaft, with the pinion driven by a suitable belt. The connection between the link and ram is, as usual, adjustable, the link being attached to a clamp device released and tightened by a hand-lever V, and the shifting of the place of connection between the clamp device and the ram being effected by a screw-shaft W, that engages the clamp device and has a bevel-pinion $w$ meshing with a like pinion $w'$ on a shaft having an operating-handle $w^2$.

The cutting-tool is carried by a slide X, mounted in guides on the face of a frame Y on the end of the carriage or ram. The frame Y has a round boss or hub $y$, that fits a socket in the ram and constitutes a pivot on which the frame may be turned to change its angle relative to the ram. For securely holding the frame in position a sleeve B′ passes through the boss or hub and into the ram and has a flange or head $b$, that engages the boss or hub. To draw the flange or head $b$ against the hub, and thus bind or clamp the frame Y against the end of the ram, inclines $b'$ and $b'$ are formed on opposite sides of the sleeve B′ and are engaged by the inclined sides of a vertically-movable bifurcated wedge C′, that straddles the sleeve, and is engaged and moved downward by a screw D′. For the accurate adjustment of the frame Y it has a scale or graduations on its edge on one side, and there is an index or pointer on the periphery of a flange on the end of the tool-carriage or ram adjacent which the frame is held.

Journaled in the frame Y is a vertical threaded shaft or screw E′, that passes through a threaded opening in the slide X, by the revolution of which the slide is moved to feed the tool. On the upper end of the shaft is a handle $e'$, while on the lower end of said shaft is a bevel-pinion $e^2$, which meshes with a like pinion on the front end of a horizontal shaft F′, passing through and journaled in the sleeve B′. On the rear end of said shaft is a ratchet-wheel G′, and alongside the latter and loose on the shaft is an arm H′, in an opening in which is mounted a pawl $h^2$, that is movable parallel with the shaft-axis, being pressed in toward the ratchet-wheel by a spring and moved in the opposite direction by an inclined or cam surface on the end of a pin I′, held in the ram O, that engages a lateral lug or stud $h^3$ on the pawl just before the arm H′ reaches the limit of its motion in the direction for moving the ratchet-wheel.

The arm H′ has a gear-segment with which engages a rack $k$ in the form of a spiral or screw-thread on a reciprocating rod or bar K′, that extends transversely of the ram, and has one end protruding from the side of the latter in the path of a cam-plate L′, adjustably secured alongside the ram to one of the ways or guides thereof, with which cam-plate said end will engage as the ram moves and the rod thereby be moved longitudinally and act to swing the pawl-carrying arm an extent proportioned to the movement of the rod. When so moved by this movement of the rod, the pawl-carrying arm acts to move the pawl from the cam on the pin and permit it to move into contact with the ratchet-wheel, and then it trips over the teeth of the latter ready to engage one of the same on the return movement, and thereby revolve the ratchet-wheel. Such return movement is produced by a coiled spring $k^2$, encircling a portion of the rod, one end of which bears against one end of the rack on the rod and the other against a shoulder on one of the rod-bearings.

Meshing with a long pinion $k'$ on the rod K′ is a gear M′ on the inner end of a shaft $m^3$, and on the outer end of said shaft is fixed a radial arm $m^4$, having a spring-pressed pin $m^5$, adapted to engage any one of a series of holes $m^6$ to lock or hold the arm stationary. It will be seen that by revolving the rod K′ through the instrumentality of the gear M′ and the pinion $k'$ said rod by reason of the screw-form rack $k$ will be moved longitudinally and by means of the pins $m^5$ be locked or held in the position to which it may be moved. As its position in an endwise direction may thus be changed relative to the cam-plate L′, it is evident that the amount of its movement by said cam-plate can be varied, and consequently the extent of rotation of the shaft F′ and the extent of automatic downfeed of the tool may be varied.

On the shaft F′ is a worm $f$, meshing with which is a worm-wheel N′ on a shaft $n$, that extends to the outside of the ram and there carries a radial arm $n'$. In the path of the latter is a stop-pin O′ adjustable to different positions in a slot or groove curved concentric with the shaft. When the arm $n'$ encounters the stop-pin O′, said arm is arrested, and through its above-described connection with the shaft F′ the latter is prevented from being turned by the action of the spring $k^2$, and thus the automatic downfeed of the tool is stopped. It will be evident that by setting the stop-pin to different positions in the slot or groove the time for automatic stopping the automatic feed of the tool can be varied.

The tool-post $p$ is attached to a block $p'$, pivoted to a plate P′, that is adjustably secured to the face of the slide X, being pivoted to the latter by a stud $p^2$ and held in the position to which it may be turned on said stud by bolts $p^3$ and $p^3$, passing through a segmental slot $p^4$ in the plate.

The machine having the construction shown and described effects the automatic downfeed of the tool by the reciprocation of the tool-carriage or ram until the desired depth of cut has been produced, whereupon the downfeed is automatically stopped, although the reciprocation of the tool-carriage or ram may continue. On the completion of each feeding movement of the pawl of the automatic feeding mechanism, the pawl being freed from the ratchet-wheel, the tool may be adjusted in the usual manner by turning the feed-screw E′ by its handle $e'$. It will be apparent that without the disengagement of the pawl and ratchet-wheel the feed-screw E′ could not be turned in one direction. Indexes being provided for the various adjustments, accurate duplication of work by the machine is readily done.

Having thus described our invention, what we claim is—

1. In a shaping-machine, the combination of a reciprocating tool-carriage, means for automatically feeding the tool actuated by the reciprocation of the carriage, including a part mounted on and moving with the carriage, and adjustable means for wholly stopping the action of the tool-feeding means on the tool, acting after a predetermined period of operation, whereby the reciprocation of the carriage may continue without feeding the tool.

2. In a shaping-machine, the combination of a reciprocating tool-carriage, a tool-slide, a shaft geared to the latter, means for revolving said shaft always in the same direction to feed the tool automatically actuated by the reciprocation of the carriage, an adjustable stop for arresting the feed of the tool at a predetermined point, and a part operated by said shaft that engages said stop, whereby the reciprocation of the carriage may continue without feed of the tool, substantially as and for the purpose described.

3. In a shaping-machine, the combination of a tool-carriage, a tool-slide, a shaft geared to the latter, having a worm, a worm-wheel in mesh with the worm, means to revolve said shaft to feed the tool, and means to arrest the feed of the tool comprising an adjustable stop, an arm to coöperate with the latter and receiving motion from said worm-wheel, and means actuated by the reciprocation of the carriage to operate said shaft, substantially as and for the purpose described.

4. In a shaping-machine, the combination of a tool-carriage, a tool-slide, a feed-screw engaging the slide, a shaft geared to said screw and having a worm, a worm-wheel in mesh with the worm, an arm on the worm-wheel shaft, an adjustable stop that is engaged by said arm to arrest the feed of the tool at a predetermined point, and means actuated by the reciprocation of the carriage to operate the worm-shaft, substantially as and for the purpose described.

5. In a shaping-machine, the combination of the reciprocating tool-carriage, tool-feeding mechanism, a longitudinally-movable rod for actuating said tool-feeding mechanism, means for giving motion to the rod from the movement of the tool-carriage, and a stop to arrest the action of the tool-feeding mechanism, whereby the reciprocation of the tool-carriage may continue without feeding the tool, substantially as and for the purpose described.

6. In a shaping-machine, the combination of the reciprocating tool-carriage, tool-feeding mechanism, a longitudinally-movable rod for actuating said tool-feeding mechanism, mounted transversely of the tool-carriage, and a cam in the path of the rod as it is moved along with the carriage, substantially as and for the purpose described.

7. In a shaping-machine, the combination of a tool-carriage, tool-feeding mechanism, a longitudinally-movable rod for actuating said tool-feeding mechanism, a spring to move said rod in one direction, means to move it in the opposite direction, and a stop to arrest the action of the tool-feeding mechanism, whereby the reciprocation of the tool-carriage may continue without feeding the tool, substantially as and for the purpose described.

8. In a shaping-machine, the combination of a reciprocating tool-carriage, tool-feeding mechanism, a longitudinally-movable rod for actuating said tool-feeding mechanism mounted transversely of the tool-carriage, a spring to move said rod in the direction to produce feed of the tool, and a cam to move it in the opposite direction, substantially as and for the purpose described.

9. In a shaping-machine, the combination of a reciprocating tool-carriage, a tool-feeding mechanism comprising a shaft, a spring-pressed rod extending transversely of the tool-carriage, a cam-plate at one side of the tool-carriage, and means for transmitting movement of said rod to the shaft of the tool-feeding mechanism, substantially as and for the purpose described.

10. In a shaping-machine, the combination of a reciprocating tool-carriage, tool-feeding mechanism, a longitudinally-movable rod for actuating said tool-feeding mechanism, a spring to move said rod in one direction, a cam to move it in the opposite direction, and a stop to arrest the action of the tool-feeding mechanism, substantially as and for the purpose described.

11. In a shaping-machine, the combination of the reciprocating tool-carriage, the tool-slide, a feed-screw engaging the tool-slide, a spring-pressed rod extending transversely of the tool-carriage, a cam-plate adjustably secured at one side of the reciprocating tool-carriage, and mechanism substantially as described for transmitting the movement of said rod to the feed-screw, substantially as and for the purpose described.

12. In a shaping-machine, the combination of a feed mechanism, a reciprocating rod to actuate said mechanism having a screw-form rack, a toothed part engaged by the latter, said rod being rotatable to shift its position longitudinally, and means to reciprocate said rod, substantially as and for the purpose described.

13. In a shaping-machine, the combination of a feed mechanism, a reciprocating rod to actuate said mechanism having a screw-form rack, a toothed part engaged by the rack, means to reciprocate said rod, and means to rotate the rod to adjust its position longitudinally, substantially as and for the purpose described.

14. In a shaping-machine, the combination of a feed mechanism, a reciprocating rod to actuate said mechanism having a screw-form rack, a toothed part engaged by the rack, means to reciprocate said rod, a pinion on the rod, a gear meshing with the pinion, an arm connected with the gear, and means for securing said arm in different positions, substantially as and for the purpose described.

15. In a shaping-machine, the combination of a reciprocating tool-carriage, a relatively fixed cam-plate, a rod coöperating with the cam-plate and having a screw-form rack, a toothed part engaged by the rack, a tool-feeding screw, mechanism whereby the tool-feeding screw is actuated from the rack-engaged part, a pinion on said rod, a gear meshing with the pinion, an arm connected with the gear, and means for securing said arm in different positions, substantially as and for the purpose described.

16. In a shaping-machine, the combination of a tool-feeding mechanism, a reciprocating rod for actuating said mechanism, a pinion on said rod, a gear meshing with the pinion, an arm connected with the gear, and means for securing said arm in different positions, substantially as and for the purpose described.

17. In a shaping-machine, the combination of the reciprocating tool-carriage, the rod K′, the cam-plate, the pinion $k'$ on the rod, the gear meshing with the pinion, the arm $m^4$ on the gear-shaft, and a locking-pin $m^5$ to secure the arm in different positions, substantially as and for the purpose described.

18. In a shaping-machine, the combination of the reciprocating tool-carriage, the cam-plate, a tool-feeding screw-shaft E′, a spring-pressed rod K′ having a screw-form rack $k$, the shaft F′, gears connecting the shafts E′ and F′, the pawl-carrying arm H′ having a gear-segment meshing with said rack, and the ratchet-wheel G′ on the shaft F′, substantially as and for the purpose described.

19. In a shaping-machine, the combination of a tool-feeding mechanism, means for operating said mechanism by hand, a pawl-and-ratchet device for operating said mechanism, an arm carrying the pawl, and a cam fixed in the path of the pawl at the limit of travel thereof with said arm in the direction in which the pawl is moved while in engagement with the ratchet, said cam being adapted to engage the pawl thereat and free it from the ratchet, the movement of the pawl by the cam being caused by the movement of the pawl in contact with the cam, the disengagement of the pawl and ratchet leaving the tool-feeding mechanism free to be operated by the hand-operated means.

20. In a shaping-machine, the combination of a tool-feeding mechanism, the reciprocating tool-carriage, a cam-plate on a relatively fixed part, a spring-pressed rod having a rack, a toothed pawl-carrying arm engaging the rack, a ratchet-wheel, and a pawl-actuating cam to withdraw the pawl from engagement with the ratchet-wheel, substantially as and for the purpose described.

21. In a shaping-machine, the combination of a carriage, a support pivoted thereon by a hub or boss, a part passing through said hub or boss, into the carriage, and having a head or enlargement engaging the boss, and a wedge that acts on the headed part to clamp said support, substantially as and for the purpose described.

22. In a shaping-machine, the combination of a carriage, a tool-support pivoted thereon, tool-feeding mechanism, a shaft for actuating the latter that is concentric with the center of movement of said support, and a clamping-sleeve through which said shaft passes, substantially as and for the purpose described.

23. In a shaping-machine, the combination of a carriage, a tool-support pivoted thereon, tool-feeding mechanism, a shaft for actuating the latter that is concentric with the center of movement of said support, a sleeve through which said shaft passes having a head or enlargement, and a wedge that acts on said sleeve to clamp its head or enlargement against the tool-support, substantially as and for the purpose described.

24. In a shaping-machine, the combination of the reciprocating tool-carriage, the tool-support having a boss engaging the carriage, a sleeve having a head that engages the boss, a wedge engaging inclined surfaces on the sleeve, and an index for use in adjusting the tool-support, substantially as and for the purpose described.

25. In a shaping-machine, the combination of a vertically, horizontally and rotatably adjustable work-support, a reciprocating tool-carriage, a tool-support pivotally mounted at the end of the carriage, a clamping device for securing the tool-support in a desired position, a feed-screw for the tool, a cam-plate, mechanism actuated thereby for automatically operating the feed-screw, and an automatic stop for limiting the feed of the tool, substantially as and for the purpose described.

In testimony that we claim the foregoing we have hereunto set our hands this 5th day of July, 1901.

JAMES CHARLES POTTER.
JOHN JOHNSTON.

Witnesses:
GEO. I. PARKER,
VERNUM L. MINER.